United States Patent [19]
Wastell

[11] Patent Number: 5,373,811
[45] Date of Patent: Dec. 20, 1994

[54] NIPPLE WATERER SUBSTITUTE COMPRESSION ELEMENT

[76] Inventor: Terry Wastell, 8315 Decatur St., Omaha, Nebr. 68114

[21] Appl. No.: 183,885

[22] Filed: Jan. 21, 1994

[51] Int. Cl.$^5$ .............................. A01K 7/00
[52] U.S. Cl. ................................. 119/72.5
[58] Field of Search ............. 119/72, 72.5, 74, 75; 137/333, 339

[56] References Cited

U.S. PATENT DOCUMENTS

| | | | |
|---|---|---|---|
| 957,347 | 5/1910 | Kennedy . | |
| 2,088,248 | 7/1937 | Perry | 152/12 |
| 3,513,811 | 5/1970 | Graham | 119/72.5 |
| 3,613,642 | 10/1971 | Restall | 119/75 |
| 3,698,685 | 10/1972 | Lang | 251/303 |
| 4,258,666 | 3/1981 | Edstrom | 119/72.5 |
| 4,391,225 | 7/1983 | Sparks | 119/72.5 |
| 4,403,570 | 9/1983 | Freehafer | 119/72.5 |
| 4,589,373 | 5/1986 | Hostetler | 119/72.5 |
| 4,637,345 | 1/1987 | Hostetler | 119/72.5 |
| 5,074,250 | 12/1991 | Clark, IV | 119/72.5 |
| 5,131,622 | 7/1992 | Chang | 119/72.5 X |

FOREIGN PATENT DOCUMENTS 694154 10/1979 U.S.S.R. .

*Primary Examiner*—Gene Mancene
*Assistant Examiner*—Thomas Price
*Attorney, Agent, or Firm*—John A. Beehner

[57] ABSTRACT

The present invention is directed to an animal actuated drinking apparatus allowing animals to obtain liquid therefrom. The invention is directed to an apparatus, a kit, and a method of providing for an animal actuated drinking apparatus. The animal actuated drinking apparatus of the present invention includes a tubular body having a fluid passageway therethrough; an annular valve seat positioned within the fluid passageway, and an O-ring of resilient material seating against the annular valve seat. A valve actuator stem is adapted to seat against O-ring and in sealing engagement therewith. An elongated, generally cylindrical, elastomeric compression biasing sleeve of resilient material being in pressure contact with the valve actuator and maintaining the actuator in a neutral position. Displacement of the actuator stem from the neutral position causes fluid to flow through the apparatus. The replacement kits may be fitted with one or two piece actuators.

The method of the present invention includes replacing a conventional spring biasing member and associated actuator in a conventional animal actuated drinking apparatus with a valve actuator stem having a transverse slot therein, and an elastomeric compression biasing sleeve of resilient material having a fluid passage therethrough.

8 Claims, 2 Drawing Sheets

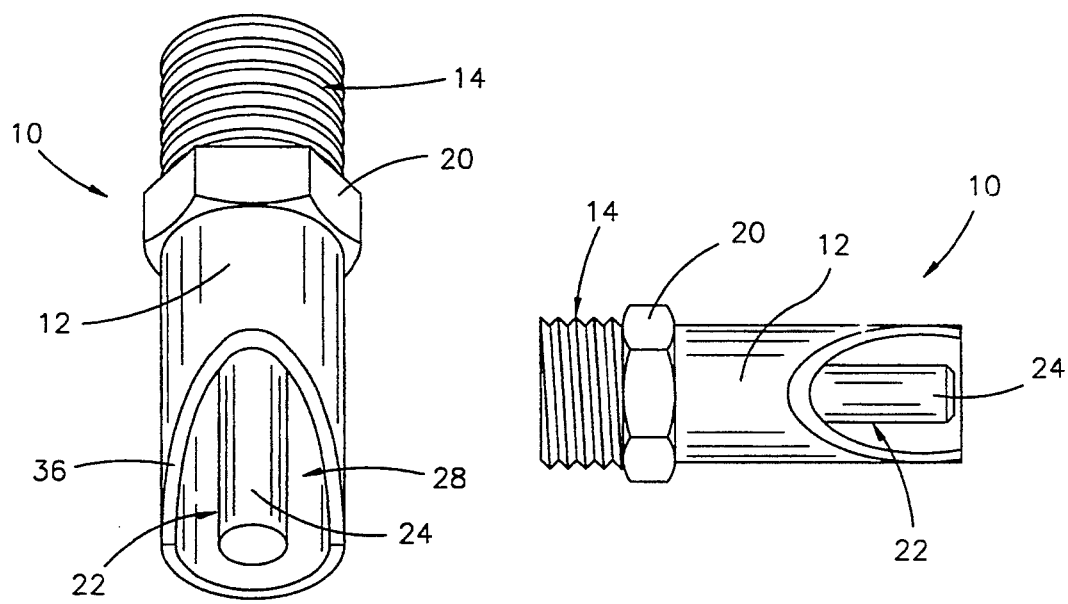
FIG. 1
FIG. 2
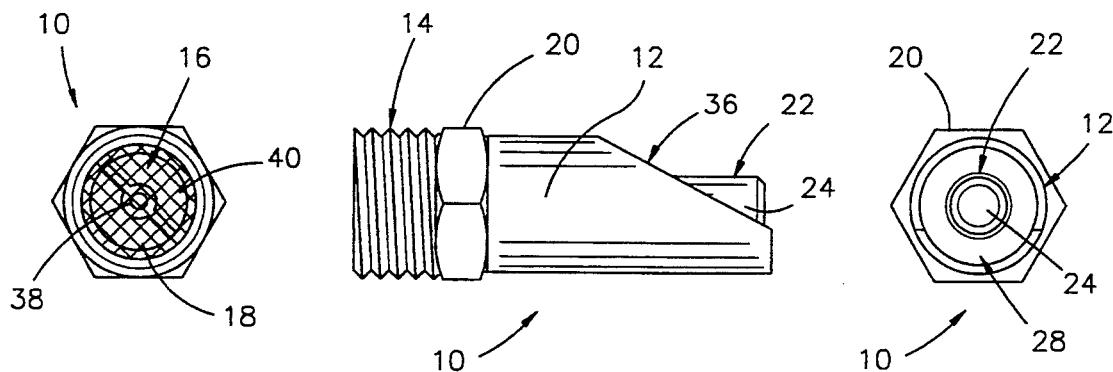
FIG. 3　　FIG. 4　　FIG. 5
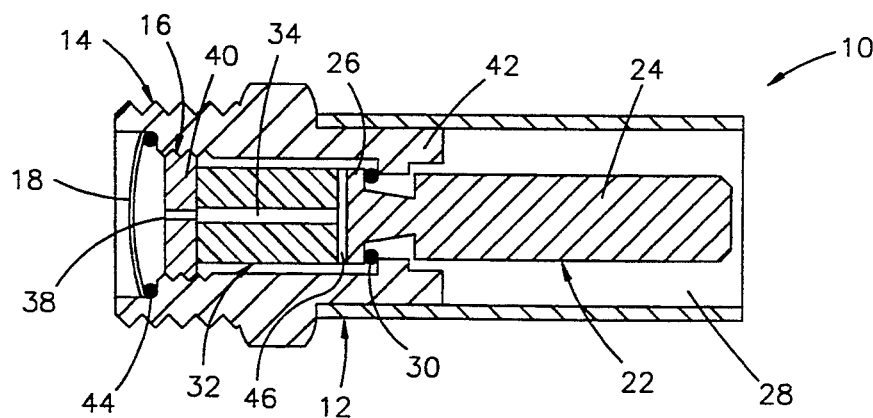
FIG. 6

NIPPLE WATERER SUBSTITUTE COMPRESSION ELEMENT

BACKGROUND OF THE INVENTION

1. Technical Field

This invention relates generally to watering apparatuses. More specifically, it relates to an animal activated watering apparatuses for various livestock such as cows, pigs and the like.

2. Description of the Prior Art

Animal activated watering apparatuses have been known for some time. One well known example is the "Stingy Nipple" nozzles manufactured by Hjalmarsons. This unit comprises a hollow nipple body and an actuator which is biased against an internal O-ring seal by means of a conventional spring. The water actuator is biased to the neutral position in approximately the center of the hollow nipple body. When the animal desires a drink of water, the waterer may be activated by the animal's biting on the nipple body. This causes the water actuator to be deflected from its neutral bias position, breaking the seal between the water actuator and the internal O-ring. This in turn causes water to flow out of the nipple body for the animal.

One reason for the desirability of having a waterer activated on an as needed basis by the animal, is to prevent the contamination which results from an open water supply. This necessitates a frequent changing of water in order to prevent disease from affecting the animal. This requires a great deal of time and effort on the part of the farmer to monitor the water supply and constantly change it.

One drawback of this type of nozzle waterer, is the weakness associated with the spring biasing member. While springs are well suited in applications involving compression, they are much less durable when the compression involves a lateral component as well as a longitudinal component. Such lateral component eventually leads to breakage of the spring. Consequently, many of these types of watering apparatuses require the springs to be changed relatively frequently due to the breakage. As a result, numerous attempts have been made to replace the spring biasing member with a more resilient substitute.

These efforts have included the apparatuses included in the Sparks, Freehaufer, and Lang patents. These devices all substitute some material in place of the spring mechanism in order to bias the actuating pin into a neutral position.

Lang, U.S. Pat. No. 3,698,685 discloses an animal actuated drinking valve having a tubular body member encasing an actuating pin urged forward by an elongated resilient biasing member. This forward biasing creates a fluid tight seal with an O-ring within the tubular body member. Deflection of the actuating pin from its neutral biased position, causes the seal between the O-ring and the actuating pin to be open, resulting in the flow of liquid through the tubular body. The main body portion of the Lang biasing member is generally rectangular in shape and engages the inside surface of the tubular body. The biasing member includes a reduced forward portion cylindrical in shape which engages the rear surface of the actuating pin sealing flange.

Freehaufer U.S. Pat. No. 4,403,570 discloses a nipple type waterer with a resilient elastomeric plug functioning as both a spring and a flow regulating orifice. The elastomeric plug is designed for threadable engagement within the flow housing. The forward end of the resilient elastomeric plug contains a seal ring concentrically surrounding the orifice running longitudinally through the plug. The seal ring creates an annular sealing contact with the rear surface of the actuating pin and which maintains the actuating pin in a normal fluid tight sealing relation with a conventional O-ring. As with the Lang device, deflection of the actuating pin from its normal biased position, causes fluid to flow through the waterer.

Finally, Sparks U.S. Pat. No. 4,391,225 discloses another springless nipple waterer valve having a valve body in which a valve member is positioned and having a head projecting in bearing engagement with the abutment member of one end of the valve body. Contact between the apex portion of the abutment member and the valve member causes the valve member to maintain a neutral fluid tight seal against the O-ring within the valve body. Deflection of the valve member of Sparks causes a fluid flow in the valve body similar to that in the Freehaufer and Lang patents, A primary objective of the present invention is to provide a biasing member for easily replacing the spring biasing member in conventional nipple waterers.

An additional objective is to provide a kit by which the actuating stem and biasing spring in a conventional nipple waterer may be removed and replaced with the biasing member and actuating stem of the present invention, Another objective is to provide a biasing member which is adapted to fit in waterers of varying diameters without the need for threadably engaging the biasing member with the tubular body, Another objective is to provide a kit which may be used to replace conventional waterers having either two piece or single integral piece actuators.

Another objective is to provide an improved waterer which may utilize either a two piece or single integral piece actuator.

A final objective is to provide a method of replacing a conventional one- or two-piece actuator and biasing member with the actuator and biasing member of the present invention,

SUMMARY OF THE INVENTION

The present invention is directed to an animal actuated drinking apparatus allowing animals to obtain liquid therefrom. The invention is directed to an apparatus, a kit, and a method of providing for an animal actuated drinking apparatus.

The animal actuated drinking apparatus of the present invention includes a tubular body having a fluid passageway therethrough, an annular valve seat positioned within the fluid passageway, which separates the fluid passageway into forward and rearward portions. A valve seat has forward and rear-ward seat faces and an O-ring of resilient material seating against the annular valve seat. A valve actuator stem has an elongated stem with forward and rearward ends and a flange portion having a forward face and a rearward face. The actuator stem and flange portions may comprise two separate pieces or may be formed from a single integral piece. The rearward face of the flange has a transverse slot therein, and the forward face is rigidly attached to the rearward end of the stem. The stem has a cross-sectional dimension smaller than the forward portion of the fluid passageway. The forward face of the flange portion is adapted to seat against the O-ring and in sealing engagement therewith, causing the forward end of the stem to extend into the forward portion of the fluid passageway.

An elongated, generally cylindrical, elastomeric compression biasing sleeve of resilient material has opposite ends and a fluid passage therethrough, one end being in pressure contact with the rearward face of the valve actuator flange portion. The fluid passage being registered with the transverse slot in the actuator flange thereby maintaining the actuator in a neutral position. Closure means are adapted to fit within the rearward portion of the fluid passageway and to achieve pressure contact with the opposite end of the cylindrical compression biasing sleeve. The closure means further has a fluid orifice therethrough such that fluid communication is maintained and regulated between the closure means, the biasing compression sleeve, and the actuator flange portion. The forward face of the actuator flange portion loses its fluid tight seal with the O-ring upon displacement of the actuator stem from the neutral position. The actuator displacement thereby causes fluid to flow through the closure means orifice, through the compression biasing sleeve fluid passage, through the transverse slot, around the flange portion, and into the tubular body forward portion at a rate determined by the diameter of the closure means orifice.

The present invention also includes a method of replacing a conventional spring biasing member and associated actuator in an animal actuated drinking apparatus allowing animals to obtain liquid therefrom. The conventional actuator may be either the two-piece type or the single integral piece type. The method includes providing a conventional animal actuated waterer having a tubular body, a fluid passageway therethrough, an annular valve seat, a valve actuator stem and a spring biasing the actuator into sealing engagement with the valve seat. The conventional actuator is replaced with an actuator having a transverse slot in the rearward face of the flange. The replacement actuator may be either of the two-piece or single integral piece type. An elongated, generally cylindrical, elastomeric compression biasing sleeve of resilient material having a fluid passage therethrough, replaces the conventional biasing spring. One end of the sleeve is placed in pressure contact with the rearward face of the valve actuator flange portion and the fluid passage is registered with the transverse slot and is secured into position. Displacement of the actuator stem from the neutral position causes fluid to flow through the waterer apparatus.

BRIEF DESCRIPTION OF THE DRAWINGS

FIG. 1 is a perspective view of a preferred embodiment of the invention.

FIG. 2 is a top plan view of the invention.

FIG. 3 is one end view of the invention showing the throttle and screen.

FIG. 4 is a side elevational view of the invention showing in particular the tapered forward portion of the body.

FIG. 5 is an opposite end view of the invention.

FIG. 6 is a sectional view of the invention showing the internal components and their interconnection.

DESCRIPTION OF THE PREFERRED EMBODIMENT

Figure 7:
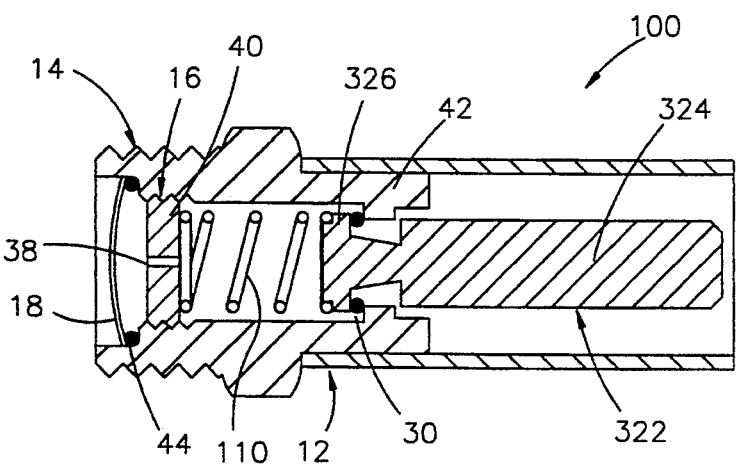
FIG. 7 is a sectional view of a nipple waterer of the prior art including the compression spring element.

The overall working configuration of the watering apparatus 10 of the present invention is shown in FIG. 1. Shown in the figure are the nipple body 20, the nipple collar 12 attached to the rear of nipple body 20 and the threaded end 14 of the nipple body providing a means for securing the water apparatus 10 to a preexisting support device (not shown). Also shown in the figure is the cylindrical portion 24 of water actuator 22. As shown in the figure, water actuator 22 is centrally located within opening 28 in nipple body 20. Also shown is the tapered front portion 36 of body 20 which allows the animal access to the water actuator 22. FIG. 2 is a top view of the water apparatus 10 showing features similar to those in FIG. 1.

FIG. 3 is an end view of the watering apparatus 10 showing the throttle element 16. Throttle element 16 comprises a threaded body portion 40 and an orifice 38. Orifice 38 is throttle 16 is operative to control the flow of fluid into the watering body using well known principles of fluid dynamics. Also shown in the figure is screen 18 secured in threaded end 14 rearward of throttle 16 and which prevents any debris material from clogging and defeating the operation of the waterer. Threaded body 40 of throttle 16 is adapted to be threadably received within the threaded end 14 of body 20 as shown more clearly in FIG. 6.

FIG. 4 is a side view of the watering apparatus 10 showing features similar to those shown in FIGS. 1 and 2 but more particularly showing the tapered front portion 36 of the collar 12. Tapering the front portion of collar 12 permits activation of the waterer through the biting action of the animal. With the front portion of the collar 12 tapered as shown, the actuator 22 is slightly exposed. This exposure allows the actuator to be spatially deflected, thereby causing water flow, when the animal bites on the front end of collar 12.

FIG. 5 is a front view of the watering apparatus 10 showing the cylindrical body 24 of water activator 22 and nipple body 20. Shown clearly in this figure is the open space 28 which surrounds the cylindrical stem 24 of actuator 22. This open space 28 provides for spatial movement of the cylindrical stem 24 of stem 22. This spatial movement of the actuator loosens the fluid tight seal between the actuator 22 and O-ring 30, discussed below, which causes activation of the waterer.

Figure 8:
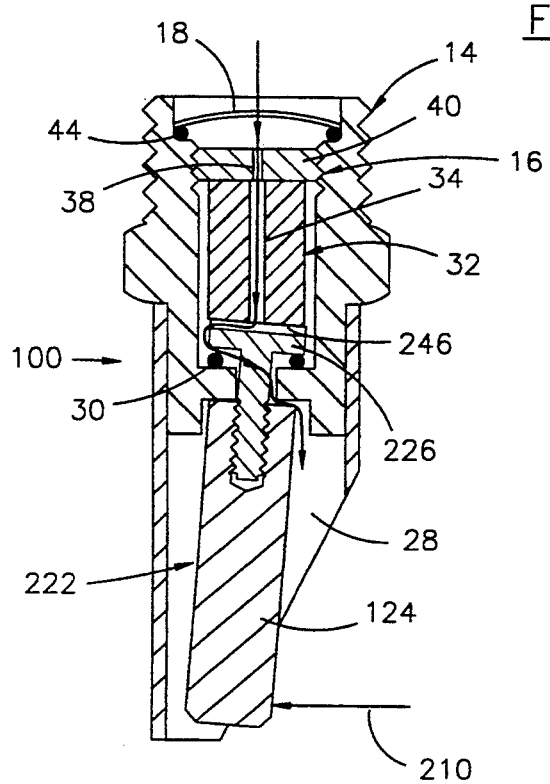
FIG. 8 is a sectional view of the nipple waterer showing the actuator offset for allowing water flow through the waterer.
Figure 10:
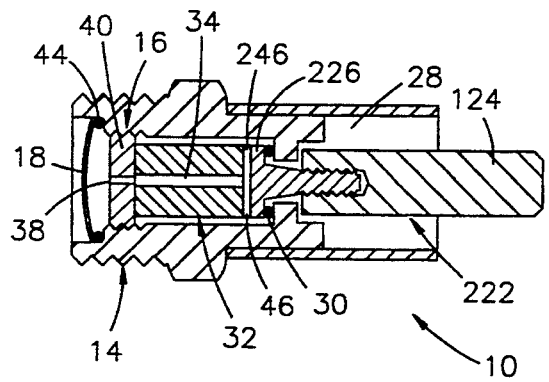
FIG. 10 is a sectional view of the nipple waterer of FIG. 9.

FIG. 6 is a cross-sectional view of the apparatus 10 showing the major internal components thereof. Shown clearly is the water actuator 22, its cylindrical stem 24, and flange portion 26. Also shown is the O-ring 30 which provides a sealing fit between the annular seat 42 and the flange 26 of actuator 22. As shown in FIG. 6, the stem 24 and flange 26 of actuator 22 are formed from a single integral piece. Alternatively, flange 26 and stem 24 may be two separate pieces rigidly joined together to form actuator 22 as shown in FIGS. 8 and 10 and described below. Also shown is the compression element 32 having an orifice 34 therethrough. As shown in the figure, compression element 32 is placed adjacent the rear face of flange 26. Throttle 16 is adapted to be threadably received within the threaded end 14 of nipple body 20. As also shown in the figure, throttle 16 is threaded into the threaded end 14 sufficiently to contact compression element 32. Thus, when compression element 32 and throttle 16 are properly installed, compression element 32 is placed in contact with throttle 16 on one end and the rear face of flange 26 on the other. The pressure provided by compression element 32 in conjunction with throttle 16 is sufficient to bias actuator 22 forward and into a liquid sealing engagement with O-ring 30.

Throttle 16 comprises orifice 38 therethrough which is operative to provide flow regulating control of the liquid from the source into the water body. By well understood principles of fluid dynamics, the diameter of orifice 38 controls the flow rate of liquid into the apparatus 10. Orifice 34 in compression element 32 is larger than orifice 38 in throttle element 16 as shown in the figure. Consequently, orifice 34 does not provide any additional flow regulating capability but rather serves merely to transmit any liquid from orifice 34 to transverse slot 46 in the rearward face of flange 26. The flow of liquid through the body is illustrated in FIG. 8 and is described in more detail below. Finally, filtering screen 18 is shown installed in the threaded end 14 of body 20 and in sealing contact with O-ring 44. Screen 18 serves to keep any blocking debris particles from entering the watering apparatus and blocking orifice 38.

Also shown in FIG. 6 is the transverse slotted portion 46 on the rearward face of flange 26. The purpose of the transverse slot 46 is to facilitate the flow of liquid from orifice 38 in throttle 16, through orifice 34 in compression element 32 and along transverse slot 46. The liquid then flows around flange 26 and out the forward passageway of the collar 12. The overall flow of the liquid is best shown in FIG. 8.

FIG. 7 is a cross sectional view of a prior art watering apparatus 100. Several features similar to those in the preferred embodiment shown in FIGS. 1–6 are also shown in FIG. 7. However, among the most obvious differences are the use of the spring 110 used to bias the water actuator 322 into its neutral fluid sealing position. The prior art device shown in FIG. 7 otherwise operates in a fashion similar to the invention shown in FIGS. 1–6 in that throttle member 16 when threadably engaged in threaded end 14 of collar 12 contacts spring 110 urging it against flange 326. Thus, in a normal non-fluid flow situation, spring 110 biases actuator 322 into a neutral, fluid tight position with respect to sealing O-ring 30. Prior art flange 326 does not include a transverse slotted portion since the fluid passing through orifice 38 is in free communication with flange 326. Finally, the actuator 322 is an integral piece comprising flange 326 and actuator 324. Alternatively, several conventional waterers currently on the market have actuators which comprise separate flange and stem portions, threadably secured together. The present invention includes a kit for replacing internal components of conventional waters with the improved components described herein. In a kit for use with conventional two piece actuators, the kit includes a replacement flange such as that shown as 226 in FIGS. 8 and 10, which may be substituted for the conventional flange as well as the replacement biasing member 32. If the conventional actuator is a single integral piece, the kit includes a replacement integral actuator which is substituted for the convention actuator 22 such as is shown in FIG. 6.

FIG. 8 shows the flow of fluid, designated with arrow 200, through the water apparatus 10. Also shown in the figure is an alternative embodiment of the invention wherein the water actuator 222 comprises two individual portions, a forward cylindrical portion 124 and a rear flange portion 226 which may be threadably secured to the cylindrical portion 124. As in the prior embodiment shown in FIGS. 1–6, flange 226 comprises a transverse slotted portion 246 to facilitate the flow of liquid through the apparatus. Components otherwise shown in this embodiment are the same as those in the embodiment illustrated in FIGS. 1–6.

Also shown in FIG. 8 is fluid flow path 200 wherein the fluid enters the rear of the body 20 flowing through orifice 38 in the throttle 16 and through orifice 34 in compression element 32. The fluid then communicates with the transverse slotted portion 246 flowing along the transverse slot 46, and around the end of the flange 226. If the actuator 222 has been displaced, the seal between the flange 226 and O-ring 30 has been broken and fluid is able to flow around flange 226 and past the O-ring 30. The fluid is then able to escape into the forward portion of body 20 where it is available to the animal. Activation of the watering apparatus is accomplished by means of lateral displacement of the water actuator as shown by arrow 210 in the figure. This causes the actuator to compress slightly compression element 32 creating the spacing between the flange 226 and O-ring 30 and providing a means for the fluid to escape past the flange seal and into the forward portion of the body.

Figure 9:
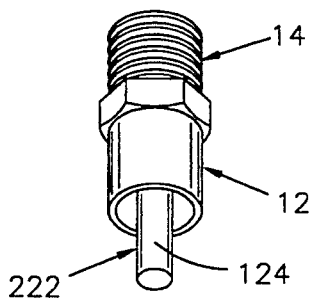
FIG. 9 is a perspective view of an alternative embodiment of the invention wherein the body terminates in a coplanar surface and wherein the actuator extends beyond this coplanar surface.

FIGS. 9 and 10 show yet another embodiment of the invention wherein the compression element would be substituted into a waterer having an actuator which extends past the end of body 20. The watering apparatus otherwise operates in an identical fashion to that shown in FIG. 8. FIG. 10 is a cross-sectional view of the alternative embodiment shown in FIG. 9 and wherein the components are identical to those shown in FIG. 8 with the exception that the forward portion of the collar 12 terminates in a substantially coplanar fashion and wherein the cylindrical portion of the water actuator 124 extends beyond the collar 12 as shown in FIG. 9. The alternative embodiment shown in FIGS. 9 and 10 may find utility in applications different from those associated with other embodiments. Such applications might be wall mounted waterers or the like. Each user is able to determine the configuration best suited to his particular situation.

Figure 11:
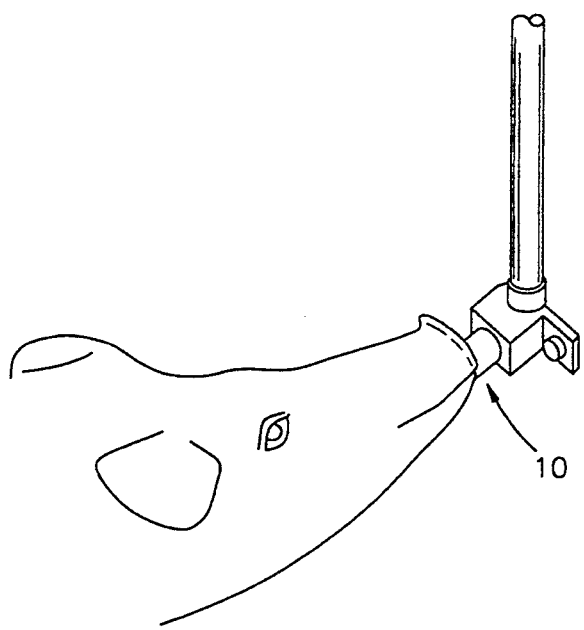
FIG. 11 is a foreshortened perspective view of a hog drinking from the nipple waterer.

Finally, FIG. 11 shows the actual operation of the device wherein the animal obtains water from the apparatus by chewing on the water actuator. The apparatus of the present invention is shown installed on a conventional water pipe which would transmit the water from the source to the individual watering units.

It will be clear to those skilled in the art that numerous substitutions for various components of the apparatus may be made while still providing an identical operation of the device. For example, various types of sealing means may be utilized in substitution of the O-ring seals. Additionally, the structure of the compression element may be varied such as by increasing or decreasing the circumferential dimension of the element. Additionally, depending on the amount of space allowed between the compression element and the inner wall of the body, the need for the transverse slotted portion in the flange may be eliminated. For example, if sufficient space is left between the compression element and the side walls that fluid may flow around the compression element and through the flange, the need for the transverse slotted portion may be eliminated. Alternatively, the transverse slotted portion may be provided on the compression element itself instead of the flange. Finally, and as described above various kit configurations may be provided for replacement of parts in a conventional waterer depending on the configuration of the conventional waterer such as whether it has a one or two piece actuator.

Therefore, it is to be understood that the above description is in no way intended to limit the scope of protection of the claim and it is representative of only one of several possible embodiments of the present invention.

Thus there has been shown and described an invention which accomplishes at least all of the stated objectives.

I claim:

1. An animal actuated drinking apparatus allowing animals to obtain liquid therefrom comprising:
   a tubular body having a fluid passageway therethrough;
   an annular valve seat positioned within said fluid passageway, thereby separating said fluid passageway into forward and rearward portions, said valve seat having forward and rearward seat faces;
   an O-ring of resilient material seating against said annular valve seat;
   a valve actuator having an elongated stem with forward and rearward ends and a flange portion having a forward face and a rearward face said rearward face having a transverse slot therein, and said forward face being rigidly attached to the rearward end of said stem, said stem having a cross-sectional dimension smaller than said forward portion of said fluid passageway and said forward face of said flange portion adapted to seat against said O-ring and in sealing engagement therewith, causing said forward end of said stem to extend into said forward portion of said fluid passageway;
   an elongated, generally cylindrical, elastomeric compression biasing sleeve of resilient material having opposite ends and a fluid passage therethrough, one end being in pressure contact with said rearward face of said valve actuator flange portion and said fluid passage being registered with said transverse slot thereby maintaining said actuator in a neutral position;
   closure means adapted to fit within said rearward portion of said fluid passageway and to achieve pressure contact with an opposite end of said cylindrical compression biasing sleeve, said closure means further comprising a fluid orifice therethrough such that fluid communication is maintained and regulated between said closure means, said biasing compression sleeve, and said actuator flange portion; and
   said forward face of said actuator flange portion losing its fluid tight seal with said O-ring upon displacement of said actuator stem from said neutral position, thereby causing fluid to flow through said closure means orifice, through said compression biasing sleeve fluid passage, through said transverse slot, around said flange portion, and into said tubular body forward portion for discharge into the mouth of an animal.

2. The animal activated drinking apparatus of claim 1 wherein said elongated stem and said flange portion of said valve actuator are formed from a single integral piece.

3. The animal activated drinking apparatus of claim 1 wherein said tubular body forward portion comprises a taper such that said forward portion terminates in a "V" shape.

4. In a nipple waterer, adapted for connection to a source of pressurized fluid, including:
   a tubular body having forward and rearward ends, a fluid passageway extended axially therethrough, and a generally radially extended valve seat at a medial position within said fluid passageway,
   seal means operatively associated with said valve seat,
   a valve actuator including an elongated stem having forward and rearward ends, a head on the rearward end thereof having a rearward surface with a transverse slot thereacross and a forward facing generally annular valve surface adapted to seat against said seal means and valve seat to block fluid flow through said fluid passageway, the forward end of said stem being accessible adjacent the forward end of said tubular body for radial displacement by an animal,
   an orifice disc removably secured within and across the rearward end of said tubular body and having a flow regulating orifice therethrough,
   the improvement comprising,
   an elongated generally cylindrical elastomeric compression biasing sleeve of resilient material compressed between said orifice disc and valve actuator head to bias said annular valve surface against said seal means and valve seat, said compression biasing sleeve having a fluid passage extended axially therethrough and in communication with said transverse slot in the actuator head to provide fluid flow through said tubular body upon displacement of the forward end of said actuator stem against the urging of said compression biasing sleeve.

5. A kit for modification of a conventional animal actuated drinking apparatus allowing animals to obtain liquid therefrom wherein the apparatus comprises a tubular body having a fluid passageway therethrough; an annular valve seat positioned within said fluid passageway, thereby separating said fluid passageway into forward and rearward portions, said valve seat having forward and rearward seat faces; an O-ring of resilient material seating against said annular valve seat; a cylindrical compression biasing sleeve; an actuator having flange and stem portions, said flange adapted for sealing engagement with said O-ring; closure means adapted to fit with said rearward portion of said fluid passageway and to achieve pressure contact with the opposite end of said cylindrical compression biasing sleeve, said closure means further comprising a fluid orifice therethrough such that fluid communication is maintained and regulated between said closure means, said biasing compression sleeve, and said annular valve seat;
   the kit comprising:
   a replacement flange portion having a forward face and a rearward face, said rearward face having a transverse slot therein, and said forward face adapted to be rigidly attached to said stem portion of said actuator, said forward face of said replacement flange portion adapted to seat against said o-ring and in sealing engagement therewith, causing said stem to extend into said forward portion of said fluid passageway;

an elongated, generally cylindrical, elastomeric compression biasing sleeve of resilient material having opposite ends and a fluid passage therethrough, one end being in pressure contact with said rearward face of said replacement flange portion and said fluid passage being registered with said transverse slot thereby maintaining said actuator in a neutral position;

said forward face of said replacement flange portion losing its fluid tight seal with said O-ring upon displacement of said actuator from said neutral portion, thereby causing fluid to flow through said closure means orifice, through said compression biasing sleeve fluid passage, through said transverse slot, around said replacement flange portion, and into said tubular body forward portion at a rate determined by said closure means orifice.

6. A kit for modification of a conventional animal actuated drinking apparatus allowing animals to obtain liquid therefrom wherein the apparatus comprises a tubular body having a fluid passageway therethrough; an annular valve seat positioned within said fluid passageway, thereby separating said fluid passageway into forward and rearward portions, said valve seat having forward and rearward seat faces; an o-ring of resilient material seating against said annular valve seat; closure means adapted to fit within said rearward portion of said fluid passageway, said closure means further comprising a fluid orifice therethrough such that fluid communication through said orifice is maintained and regulated;

the kit comprising:

a valve actuator having an elongated stem with forward and rearward ends and a flange portion having a forward face and a rearward face, said rearward face having a transverse slot therein, and said forward face being rigidly attached to the rearward end of said stem, said stem having a cross-sectional dimension smaller than said forward portion of said fluid passageway and said forward face of said flange portion adapted to seat against said o-ring and in sealing engagement therewith, causing said forward end of said stem to extend into said forward portion of said fluid passageway;

an elongated, generally cylindrical, elastomeric compression biasing sleeve of resilient material having opposite ends and a fluid passage therethrough, one end being in pressure contact with said rearward face of said flange portion and said fluid passage being registered with said transverse slot thereby maintaining said valve actuator in a neutral position; said forward face of said actuator flange portion losing its fluid tight seal with said o-ring upon displacement of said valve actuator from said neutral position, thereby causing fluid to flow through said closure means orifice, through said compression biasing sleeve fluid passage, through said transverse slot, around said flange portion, and into said tubular body forward portion at a rate determined by said closure means orifice.

7. A method of replacing a conventional spring biasing member and associated actuator in an animal actuated drinking apparatus allowing animals to obtain liquid therefrom comprising:

providing a conventional animal actuated waterer having a tubular body with a fluid passageway therethrough; an annular valve seat positioned within said fluid passageway, thereby separating said fluid passageway into forward and rearward portions, said valve seat having forward and rearward seat faces; an o-ring of resilient material seating against said annular valve seat; an integrally formed conventional actuator having flange and stem portions; a compression biasing spring adapted to fit against said conventional actuator; closure means adapted to fit within said rearward portion of said fluid passageway and to achieve pressure contact with the opposite end of said cylindrical compression biasing spring, said closure means further comprising a fluid orifice therethrough such that fluid communication is maintained and regulated between said closure means, said biasing compression sleeve, and said actuator flange portion;

removing said closure means from the rearward portion of said fluid passageway;

removing said compression biasing spring and said conventional actuator;

inserting a replacement actuator having an elongated stem with forward and rearward ends and a flange portion having a forward face and a rearward face, said rearward face having a transverse slot therein, said stem having a cross-sectional dimension smaller than said forward portion of said fluid passageway and said forward face of said flange portion adapted to seat against said o-ring and in sealing engagement therewith, causing said stem to extend into said forward portion of said fluid passageway;

inserting an elongated, generally cylindrical, elastomeric compression biasing sleeve of resilient material having opposite ends and a fluid passage therethrough, one end being in pressure contact with said rearward face of said replacement actuator flange portion and said fluid passage being registered with said transverse slot;

securing said closure means to said rearward portion of said fluid passage thereby maintaining said replacement actuator in a neutral position; and displacing said replacement actuator from said neutral position, thereby causing fluid to flow through said closure means orifice, through said fluid passage, through said transverse slot, around said flange portion, and into said tubular body forward portion at a rate determined by said closure means orifice.

8. A method of replacing a conventional spring biasing member and associated actuator in an animal actuated drinking apparatus allowing animals to obtain liquid therefrom comprising:

providing a conventional animal actuated waterer having a tubular body with a fluid passageway therethrough; an annular valve seat positioned within said fluid passageway, thereby separating said fluid passageway into forward and rearward portions, said valve seat having forward and rearward seat faces; an o-ring of resilient material seating against said annular valve seat; a conventional two-piece actuator having flange and stem portions; a compression biasing spring adapted to fit against said conventional actuator; closure means adapted to fit within said rearward portion of said fluid passageway and to achieve pressure contact with the opposite end of said cylindrical compression biasing spring, said closure means further comprising a fluid orifice therethrough such that fluid communication is maintained and regulated between said closure means, said biasing compression sleeve, and said actuator flange portion;

removing said closure means from the rearward portion of said fluid passageway;

removing said compression biasing spring and said conventional two-piece actuator;

replacing said flange portion of said conventional two-piece actuator with a replacement flange portion having a forward face and a rearward face, said rearward face having a transverse slot therein, and said forward face being rigidly attached to said stem, said forward face of said flange portion adapted to seat against said o-ring and in sealing engagement therewith, causing said forward end of said stem to extend into said forward portion of said fluid passageway;

reinstalling said actuator;

inserting an elongated, generally cylindrical, elastomeric compression biasing sleeve of resilient material having opposite ends and a fluid passage therethrough, one end being in pressure contact with said rearward face of said replacement flange portion and said fluid passage being registered with said transverse slot;

securing said closure means to said rearward portion of said fluid passage thereby maintaining said actuator stem portion in a neutral position; and displacing said actuator stem portion from said neutral position, thereby causing fluid to flow through said closure means orifice, through said fluid passage, through said transverse slot, around said flange portion, and into said tubular body at a rate determined by said closure means orifice.

* * * * *